United States Patent [19]

Shepard

[11] 3,872,144
[45] Mar. 18, 1975

[54] ORGANOALUMINUM COMPOUNDS AND THEIR PREPARATION

[75] Inventor: Lawrence H. Shepard, Baton Rouge, La.

[73] Assignee: Ethyl Corporation, Richmond, Va.

[22] Filed: Oct. 25, 1973

[21] Appl. No.: 409,415

[52] U.S. Cl. ............................................. 260/448 A
[51] Int. Cl. ............................................... C07f 5/06
[58] Field of Search ..... 260/448 R, 448 AD, 448 A, 260/340.6, 340.9, 345.1, 270 R, 299, 326.8

[56] References Cited
UNITED STATES PATENTS

| | | | |
|---|---|---|---|
| 2,827,458 | 3/1958 | Mirviss et al. | 260/448 R X |
| 2,864,842 | 12/1958 | Walter | 260/429.3 |
| 3,082,235 | 3/1963 | Stamm | 260/448 AD |
| 3,631,065 | 12/1971 | Brendel et al. | 260/448 A X |
| 3,634,482 | 1/1972 | Shepherd | 260/448 A |
| 3,641,084 | 2/1972 | Shepherd | 260/448 A |
| 3,642,825 | 2/1972 | Shepherd | 260/448 AD |
| 3,755,400 | 8/1973 | Shepherd | 260/448 A |

OTHER PUBLICATIONS

Leiss, Organometallic Chemistry, Reinhold Publ. Corp., N.Y., pp. 236–238, 240, 241, 265, 266 (1960).
Nesmeyanov et al., Methods of Elemento- Organic Chemistry, North-Holland Pub. Co., Amsterdam, Vol. 1, pp. 415, 416, 463–466 (1967).
Ziegler, Angew. Chem., Vol. 68, pp. 721–729 (1956).
Ziegler, Suomen Kemistilehti A. Vol. 30, pp. 109–122 (1957).
Ziegler et al., Ann. Vol. 629, pp. 251–256 (1960).
Gilman et al., Rec. Trav. Chim., Vol. 55, pp. 133–144 (1936).
Zakharkin et al., Doklady Akad. Nauk, Vol. 118, pp. 713–715 (1958).
Baker et al., J.A.C.S., Vol. 75, pp. 5193–5195 (1953).
Grignard et al., Compt. Rend. Vol., 179, pp. 89–92 (1924).

Primary Examiner—H. Sneed
Attorney, Agent, or Firm—Donald L. Johnson; John F. Sieberth

[57] ABSTRACT

Organoaluminum compounds possessing a vinylic aluminaoxacyclopentanone moiety are described. They are prepared by reacting a nonionic organoaluminum compound possessing an aluminacyclopentene moiety with carbon dioxide in the presence of a stable Lewis base. The compounds possessing the vinylic aluminaoxacyclopentanone moiety yield alkenoic acids of hydrolysis and hydroxymethyl alkenoic acids on oxidation and hydrolysis.

30 Claims, No Drawings

ORGANOALUMINUM COMPOUNDS AND THEIR PREPARATION

This invention relates to cyclic organoaluminum compounds and their preparation.

This invention involves, inter alia, the discovery that the aluminacycloalkene compounds of the type described in U.S. Pat. No. 3,631,065 react with carbon dioxide to produce another class of cyclic aluminum compounds. The reaction in question involves the 1:1 molecular addition as between the aluminacyclopent-3-ene moiety and the carbon dioxide whereby there is formed an organo-aluminum compound possessing a 4-vinylic-(1-alumina-2-oxacyclopentan-3-one) moiety. This latter moiety is attached by means of an aluminum-carbon bond to an organic group which in the ordinary situations will have no more than about 18 carbon atoms. For best results the reaction is performed in the presence of a stable Lewis base—i.e., a Lewis base not susceptible to excessive cleavage during the course of the reaction. Since, as pointed out more fully hereinafter, the reaction can be performed under very mild reaction conditions a wide variety of Lewis bases, including tertiary amines, ethers, and other similar substances, may be used for this purpose without encountering excess cleavage. Tertiary amines, dialkyl ethers, cycloparaffinic monoethers having a six membered ring or cycloparaffinic diethers having a five or six membered ring exemplify preferred Lewis bases.

Accordingly, in one embodiment this invention provides a process of preparing an organoaluminum compound possessing a 4-vinylic-(1-alumina-2-oxacyclopentan-3-one) moiety which comprises reacting (i) a nonionic organoaluminum compound possessing an aluminacyclopent-3-ene moiety, the moiety being attached by means of an aluminum-carbon bond to a hydrocarbon group which optionally may be substituted by no more than one additional sobonded aluminacyclopent-3-ene moiety, with (ii) carbon dioxide, the reaction being conducted in the presence of a stable Lewis base. From the cost effectiveness standpoint the preferred cyclic aluminum reactants are those in which each aluminacyclopent-3-ene moiety has the formula

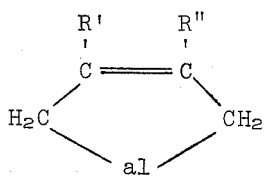

wherein R' is a hydrogen, alkyl or alkenyl group, R" is a hydrogen or alkyl group, and "al" is two-thirds of an equivalent of aluminum.

One preferred group of cyclic aluminum reactants for use in the process of this invention has the formula

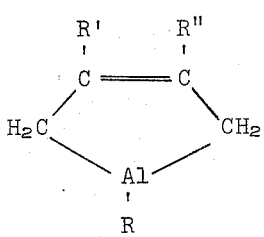

wherein R is a hydrocarbon group having up to about 18 carbon atoms, R' is hydrogen or an alkyl or an alkenyl group, and R" is hydrogen or an alkyl group. Although R' and R" may contain any suitable number of carbon atoms (e.g., 12 or more), in most cases they will contain up to about 6 carbon atoms each—i.e., they are preferably lower alkyl or lower alkenyl groups or hydrogen.

A feature of this invention is that the foregoing carbonation reaction is a facile reaction which can be readily carried out under mild reaction conditions. In fact, the reaction proceeds very smoothly and efficiently even under the low temperature, atmospheric pressure conditions conventionally used for carbonation of Grignard reagents and other highly reactive organo metallics. Thus, although the reaction can, if desired, be carried out under higher temperature and pressure conditions (e.g., 150°C. and 1,000 psi) there is no significant advantage in doing so—reactions performed at pressures within the range of from about 10 to about 100 psi and temperatures within the range of from about −80° to about 50°C. are generally found most convenient. The carbon dioxide may be employed in gaseous form or in solidified form (commonly known as "Dry Ice").

As noted above the cyclic organoaluminum compounds provided by this invention possess a 4-vinylic-(1-alumina-2-oxa-3-cyclopentan-3-one) moiety, the moiety being attached by means of an aluminum-carbon bond to an organic group which normally will contain up to about 18 carbon atoms. Exemplary compounds are those in which the moiety is one of the following:

4-vinyl-(1-alumina-2-oxacyclopentan-3-one)
4-isopropenyl-(1-alumina-2-oxacyclopentan-3-one)
4-vinyl-4-methyl-(1-alumina-2-oxacyclopentan-3-one)
4-(1-ethylvinyl)-(1-alumina-2-oxacyclopentan-3-one)
4-isopropenyl-4-methyl-(1-alumina-2-oxacyclopentan-3-one)
4-[1-(4-methyl-pent-3-enyl)vinyl]-(1-alumina-2-oxacyclopentan-3-one)

The organic group bonded by means of an aluminum-carbon bond to the aluminum atom in the 4-vinylic-(1-alumina-2-oxacyclopentan-3-one) moiety will generally correspond to the hydrocarbon group present in the initial aluminacyclopent-3-ene reactant and accordingly for further details reference may be had to U.S. Pat. Nos. 3,631,065; 3,634,482; and 3,755,400, each of which deals, inter alia, with the synthesis of organic compounds containing the aluminacyclopent-3-ene moiety. All such compounds suitable for use in the practice of this invention and in the usual case the identity of the organic group satisfying the remaining valence bond of the aluminum atom in the aluminacyclopent-3-ene moiety is of no practical significance. Normally this organic group which satisfies the third valence bond of the aluminum atom may be regarded as "excess baggage" which does not affect the outcome of the desired carbonation reaction. Under some conditions, however, it may be possible to cause carbonation of this aluminum-carbon bond (as well as both aluminum-carbon bonds of the ring) thereby making possible the formation (on hydrolysis) of an organic acid corresponding to the addition of a carboxyl group to the organic group initially bonded by the aluminum-carbon bond to the aluminacyclopent-3-ene moiety. Such reaction, to the extent it proves operative, would be expected to require forcing conditions however—e.g., use of carbon dioxide under very high pressure and at elevated temperatures.

Since the carbonation reaction of this invention is normally conducted under moderate or mild conditions, the organoaluminum compounds produced will for the most part have the formula

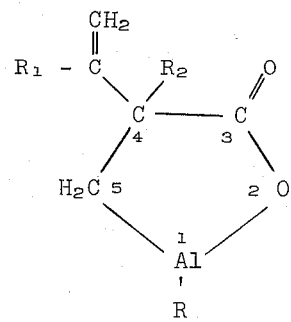

wherein R is a hydrocarbon group having up to about 18 carbon atoms (most preferably a lower alkyl group), and in the simplest cases $R_1$ is hydrogen or an alkyl or alkenyl group and $R_2$ is hydrogen or an alkyl group. Since it is convenient to utilize diisobutylaluminum hydride or sodium aluminum tetraethyl in the synthesis of the aluminacyclopent-3-ene moiety containing compounds used to form the organoaluminum compounds depicted in the above formula (see U.S. Pat. No. 3,631,065 and 3,634,482, respectively) R in the above formula will frequently is isobutyl or ethyl.

There is a marked tendency for the cyclic aluminum compounds of this invention to form complexes with Lewis bases such as amines, ethers, thioethers, and the like. These complexes, especially when the Lewis base is a tertiary amine, dialkyl ether, cycloparaffinic monoether having a six membered ring or cycloparaffinic diether having a five or six membered ring, constitute preferred embodiments of this invention.

The cyclic aluminum compounds of this invention are nonionic. They are usually soluble in conventional aliphatic and aromatic hydrocarbon solvents such as benzene.

Another feature of this invention is the fact that the organoaluminum compounds possessing a 4-vinylic-(1-alumina-2-oxacyclopentan-3-one) moiety are of particular utility as intermediates in the synthesis of polyfunctional products, especially substituted butenoic acids. By way of example, hydrolysis of the cyclic aluminum compounds of this invention results in the formation of branched chain alkenoic acids. Alternatively, the cyclic organoaluminum compounds of this invention may be subjected to low temperature oxidation with air or oxygen to yield a cyclic alkoxide intermediate which, on hydrolysis, yields 2-hydroxy methyl substituted alkenoic acids. In performing these hydrolysis reactions use may be made of water, aqueous mineral acids and aqueous mineral bases at reaction temperatures in the range of about 0° to about 25°C. The oxidation of the 4-vinyl-(1-alumina-2-oxacyclopentan-3-one) moiety to form the corresponding cyclic alkoxide moiety (1-alumina-2,6-dioxacyclohexan-3-one) utilizes reaction conditions such as described in U.S. Pat. No. 3,642,825.

In order to further appreciate the practice and advantages of this invention there are presented below in tabular form some typical reaction sequences made possible by this invention.

TABLE

| (1) Aluminum-Containing Cyclic Moiety in Reactant | (2) Aluminum-Containing Cyclic Moiety Formed on Carbonation of (1) | (3) Unsaturated Organic Acid Formed on Hydrolysis of 92) | (4) Hydroxy Substituted Unsaturated Organic Acid Formed on Oxidation of (2) Followed by Hydrolysis |
|---|---|---|---|
| aluminacyclopent-3-ene | 4-vinyl-(1-alumina-2-oxa-cyclopentan-3-one) | 2-methyl-3-butenoic acid | 2-hydroxymethyl-3-butenoic acid |
| 3-methyl-aluminacyclopent-3-ene | 4-isopropenyl-(1-alumina-2-oxacyclopentan-3-one) (major product) | 2,3-dimethyl-3-butenoic acid | 2-hydroxymethyl-3-methyl-3-butenoic acid |
| 3-methyl-aluminacyclopent-3-ene | 4-vinyl-4-methyl-(1-alumina-2-oxacyclopentan-3-one) (minor product) | 2,2-dimethyl-3-butenoic acid | 2-hydroxymethyl-2-methyl-3-butenoic acid |
| 3-ethyl-aluminacyclopent-3-ene | 4-(1-ethylvinyl)-(1-alumina-2-oxacyclopentan-3-one) | 3-ethyl-2-methyl-3-butenoic acid | 2-hydroxymethyl-3-ethyl-3-butenoic acid |
| 2,3-dimethyl-alumina-cyclopent-3-ene | 4-isopropenyl-4-methyl-(1-alumina-2-oxacyclopentan-3-one) | 2,2,3-trimethyl-3-butenoic acid | 2-hydroxylmethyl-2,3-dimethyl-3-butenoic acid |
| 3-(4-methyl-pent-3-enyl)-aluminacyclopent-3-ene | 4-[1-(4-methyl-pent-3-enyl)vinyl]-(1-alumina-2-oxacyclopentan-3-one) | 2-methyl-3-(4-methyl-pent-3-enyl)-3-butenoic acid | 2-hydroxymethyl-3-(4-methyl-pent-3-enyl)-3-butenoic acid |

From the foregoing tabulation it will be seen, for example, that on carbonation of a compound containing the aluminacyclopent-3-ene moiety a compound containing the 4-vinyl-(1-alumina-2-oxacyclopentan-3-one) moiety is formed. On hydrolysis of the latter (e.g., with water or moist nitrogen at 0° to 25°C.) 2-methyl-3-butenoic acid is formed. If on the other hand the compound containing the 4-vinyl-(1-alumina-2-oxacyclopentan-3-one) moiety is subjected to mild oxidation (e.g., oxidation with air at 0° to 60°C.) followed by hydrolysis, 2-hydroxymethyl-3-butenoic acid is produced. The other transformations set forth in the above tabulation give an indication of the variety of products which can be produced in accordance with this invention. Further, it is of course possible to isomerize the double bond in the 3-butenoic products produced upon hydrolysis (columns 3 and 4 of the above tabulation). Thus if a butenoic acid having a double bond in a different position is desired, conventional thermal or catalytic isomerization procedures may be employed.

The following example specifically illustrates a typical synthesis of a compound of this invention and its use as an intermediate in the formation of a 3-butenoic acid product. This example is presented merely for the purpose of illustration and should not be construed in a limiting sense.

EXAMPLE

Reaction of 1-isobutyl-3-methyl-aluminacyclopent-3-ene with carbon dioxide followed by hydrolysis A diethyl ether solution (50 ml) of 1-isobutyl-3-methyl-aluminacyclopent-3-ene (see U.S. Pat. No. 3,631,065) was poured into a mixture of dry ice and diethyl ether in a nitrogen atmosphere. The mixture was periodically stirred until all of the dry ice had sublimed. The mixture was then hydrolyzed with dilute aqueous HCl and soluble materials were extracted from the organic phase with water. The organic phase was then dried with magnesium sulfate, the ether was evaporated from the dried organic phase and the liquid residue was vacuum distilled. In this way, a mixture of 1.3 grams of organic acids, boiling at 95°C. at 15 millimeters of mercury pressure was isolated in 34 percent yield. The nuclear magnetic resonance spectrum and the infrared spectrum of these products indicated them to be a mixture of 2,3-dimethyl-3-butenoic acid and 2,2-dimethyl-3-butenoic acid in proportions of 82 percent and 18 percent, respectively. The boiling point of 2,3-dimethyl-3-butenoic acid has been reported [Boonstra et al., Rec. Trav. Chem. 79, 866-87 (1960)] to be 100° - 105°C. at 19 millimeters of mercury pressure and the boiling point of 2,2-dimethyl-3-butenoic acid has been reported [Parham et al., J. Org. Chem. 31, 1694-8 (1966)] to be 88°C. at 16 millimeters of mercury pressure. Both of the acids formed in this experiment were readily converted to their corresponding methyl esters on treatment with diazomethane.

It will be seen, therefore, that the cyclic organoaluminum products formed in the above carbonation reaction were 1-isobutyl-4-isopropenyl-(1-alumina-2-oxacyclopentan-3-one):

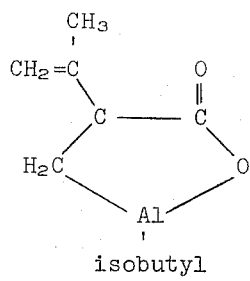

and 1-isobutyl-4-vinyl-4-methyl-(1-alumina-2-oxacyclopentan-3-one):

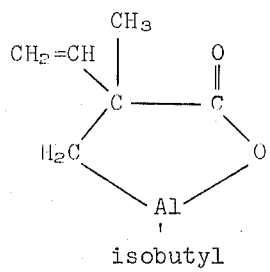

in the proportions of about 82/18 percent, respectively.

It is interesting that no isovaleric acid was produced in the experiment even though isobutylaluminum groups (46 mmoles) were present during the carbonation step. This serves to illustrate the facile nature of the carbonation reaction of this invention as compared to carbonation of conventional organoaluminum groups. In other words, the aluminacyclopent-3-ene moiety is considerably more reactive toward carbon dioxide than trialkylaluminum compounds, for example.

As noted above the process of this invention is normally conducted in the presence of a Lewis base having suitable chemical stability under the reaction conditions being utilized. In most cases the Lewis base will be employed as the principal reaction solvent—i.e., the reacion will be conducted in the Lewis base selected for use. However, if desired, the reaction may be effected in a suitable inert hydrocarbon medium (e.g., paraffinic or aromatic hydrocarbon solvents such as hexane, heptane, octane, decane, cyclohexane, benzene, toluene, xylenes, and the like) provided a suitable amount of the Lewis base is also present in the reaction system. Ordinarily the system should contain at least one or two mols of Lewis base per mol of aluminum reactant employed. Particularly convenient Lewis bases for use in the process as tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N,N',N'-tetramethyl ethylene diamine, pyridine, N-methyl pyrrolidine, triethylene diamine, quinuclidine, and the like); dialkyl ethers (e.g., dimethyl ether, diethyl ether, disopropyl ether, methylisoamyl ether, dibutyl ether, dihexyl ether and the like); cycloparaffinic monoethers having a six membered ring (e.g., tetrahydropyran—pentamethylene oxide—and ring alkylated derivatives thereof); and cycloparaffinic diethers having a five or six membered ring (e.g., 1,4-dioxane, 1,3-dioxolane, 2-methyl-2-ethyl-1,3-dioxolane; and the like); and other similar substances which tend not to be excessively cleaved in the reaction, such as dicyclohexyl ether, dibenzyl ether, and the like. At the lower reaction temperatures glycol ethers are also suitable solvents.

The relative proportions of the reactants and reaction diluents do not appear to be critical as long as there is present a sufficient amount of each reactant to participate in the desired reaction.

Ordinarily the reaction will be conducted at atmospheric pressure or at the ambient pressures encountered when conducting the reaction in a closed reaction vessel. However, when using some of the lower boiling Lewis base solvents, e.g., dimethyl ether, trimethyl amine or the like, it is desirable to conduct the reaction at a high enough pressure to keep the system in the liquid state of aggregation. Thus, pressures up to about 50 atmospheres may be employed.

It will of course be understood that in the carbonation reaction the reaction mixture should be kept essentially anhydrous and that exposure of the reaction system to air should be kept at a minimum.

The period of time during which the reactants interact with each other is susceptible to considerable variation and is generally discretionary. In general, the higher the reaction temperature, the shorter the reaction or contact time.

Exemplary of the compounds of this invention may be produced in the manner described above are the following:

4-vinyl-1-ethyl-(1-alumina-2-oxacyclopentan-3-one)
4-isopropenyl-1-propyl-(1-alumina-2-oxacyclopentan-3-one)
4-isopropenyl-1-butyl-4-methyl-(1-alumina-2-oxacyclopentan-3-one)
4-(1-ethylvinyl)-1-isobutyl-(1-alumina-2-oxacyclopentan-3-one)
4-vinyl-1-decyl-(1-alumina-2-oxacyclopentan-3-one)
4-isopropenyl-1-phenyl-(1-alumina-2-oxacyclopentan-3-one)
4-vinyl-1-cyclohexyl-(1-alumina-2 -oxacyclopentan-3-one)
4-[1-(4-methyl-pent-3-enyl)vinyl]-1-methyl-(1alumina-2-oxacyclopentan-3-one)
4-vinyl-1-octadecyl-(1-alumina-2-oxacyclopentan-3-one)

Other products of this invention and their synthesis and uses will be clearly apparent to those skilled in the art from a consideration of the foregoing disclosure and ensuing claims.

I claim:

1. An organoaluminum compound possessing a 4-vinylic-(1-alumina-2-oxacyclopentan-3-one) moiety, the moiety being attached by means of an aluminum-carbon bond to a hydrocarbon having up to about 18 carbon atoms.

2. A compound according to claim 1 wherein said moiety is the 4-vinyl-(1-alumina-2-oxacyclopentan-3-one) moiety.

3. A compound according to claim 1 wherein said moiety is the 4-isopropenyl-(1-alumina-2-oxacyclopentan-3-one) moiety.

4. A compound according to claim 1 wherein said moiety is the 4-vinyl-4-methyl-(1-alumina-2-oxacyclopentan-3-one) moiety.

5. A compound according to claim 1 wherein said moiety is the 4-(1-ethylvinyl)-(1-alumina-2-oxacyclopentan-3-one) moiety.

6. A compound according to claim 1 wherein said moiety is the 4-isopropenyl-4-methyl-(1-alumina-2-oxacyclopentan-3-one) moiety.

7. A compound according to claim 1 wherein said moiety is the 4-[1-(4-methyl-pent-3-enyl)vinyl]-(1-alumina-2-oxacyclopentan-3-one) moiety.

8. A compound according to claim 1 complexed with a Lewis base.

9. An organoaluminum compound of the formula

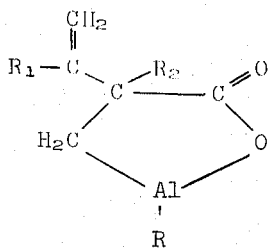

wherein R is a hydrocarbon group having up to about 18 carbon atoms, $R_1$ is hydrogen or an alkyl or alkenyl group, and $R_2$ is hydrogen or an alkyl group.

10. A compound according to claim 9 wherein R is a lower alkyl group.

11. A compound according to claim 9 wherein R is an isobutyl group.

12. A compound according to claim 9 wherein R is an ethyl group.

13. A compound according to claim 9 complexed with a Lewis base.

14. A compound according to claim 9 complexed with a tertiary amine, a dialkyl ether, a cycloparaffinic monoether having a six-membered ring or a cycloparaffinic diether having a five- or six-membered ring.

15. A compound according to claim 9 complexed with 1,4-dioxane.

16. A compound according to claim 9 wherein the compound is 1-isobutyl-4-isopropenyl-(1-alumina-2-oxacyclopentan-3-one).

17. A compound according to claim 9 wherein the compound is 1-isobutyl-4-vinyl-4-methyl-(1-alumina-2-oxacyclopentan-3-one).

18. A compound according to claim 9 wherein the compound is a mixture of 1-isobutyl-4-isopropenyl-(1-alumina-2-oxa-3-cyclopentan-3-one) and 1-isobutyl-4-vinyl-4-methyl-(1-alumina-2-oxacyclopentan-3-one).

19. A process of preparing an organoaluminum compound possessing a 4-vinylic-(1-alumina-2-oxacyclopentan-3-one) moiety which comprises reacting (i) a nonionic organoaluminum compound possessing an aluminacyclopent-3-ene moiety, the moiety being attached by means of an aluminum-carbon bond to a hydrocarbon group which optionally may be substituted by no more than one additional so-bonded aluminacyclopent-3-ene moiety, with (ii) carbon dioxide, the reaction being conducted in the presence of a stable Lewis base.

20. The process of claim 19 wherein the Lewis base is a tertiary amine, a dialkyl ether, a cycloparaffinic monoether having six-membered ring, or a cycloparaffinic diether having a five- or six-membered ring.

21. The process of claim 19 wherein the Lewis base is 1,4-dioxane.

22. The process of claim 19 wherein the aluminacyclopent-3-ene moiety has the formula

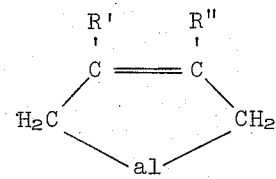

wherein R' is a hydrogen, alkyl or alkenyl group, R'' is a hydrogen or alkyl group, and "al" is two-thirds of an equivalent of aluminum.

23. A process of preparing an organoaluminum compound possessing a 4-vinylic-(1-alumina-2-oxacyclopentan-3-one) moiety which comprises reacting in an ether reaction medium carbon dioxide and an organoaluminum compound of the formula

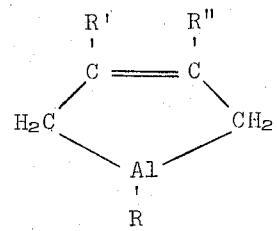

wherein R is a hydrocarbon group having up to about 18 carbon atoms, R' is a hydrogen, lower alkyl or lower alkenyl group, and R″ is a hydrogen or lower alkyl group.

24. The process of claim 23 wherein the ether reaction medium is composed of 1,4-dioxane.

25. The process of claim 23 where R is a lower alkyl group.

26. The process of claim 23 wherein R is a lower alkyl group and the ether reaction medium is composed of at least one dialkyl ether or cycloparaffinic monoether having a six-membered ring or cycloparaffinic diether having a five- or six-membered ring.

27. The process of claim 23 wherein the reaction is carried out at a temperature within the range of from about −80° to about 50°C.

28. The process of claim 23 wherein the carbon dioxide is employed in gaseous form.

29. The process of claim 23 wherein the carbon dioxide is employed in solidified form.

30. The process of claim 23 wherein the reaction is carried out at a pressure within the range of from about 10 to about 100 psi.

* * * * *